(12) United States Patent
Mahudeswaran et al.

(10) Patent No.: US 11,526,491 B1
(45) Date of Patent: Dec. 13, 2022

(54) METHOD AND SYSTEM FOR COLLECTING DATA FROM DATA SOURCES WITH COMMIT LAG TO MAINTAIN DATA CONSISTENCY IN A DATA STORE

(71) Applicant: Clari Inc., Sunnyvale, CA (US)

(72) Inventors: Deepak Mahudeswaran, Sunnyvale, CA (US); Kannan Chandrasekaran, Collierville, TN (US); Brian Becker, Colorado Springs, CO (US)

(73) Assignee: CLARI INC., Sunnyvale, CA (US)

( * ) Notice: Subject to any disclaimer, the term of this patent is extended or adjusted under 35 U.S.C. 154(b) by 0 days.

(21) Appl. No.: 17/736,421

(22) Filed: May 4, 2022

Related U.S. Application Data

(60) Provisional application No. 63/312,262, filed on Feb. 21, 2022.

(51) Int. Cl.
*G06F 16/23* (2019.01)
*G06F 16/2458* (2019.01)

(52) U.S. Cl.
CPC ...... *G06F 16/2365* (2019.01); *G06F 16/2379* (2019.01); *G06F 16/2477* (2019.01)

(58) Field of Classification Search
CPC .. G06F 16/27; G06F 16/2365; G06F 16/2379; G06F 16/273; G06F 16/2358;
(Continued)

(56) References Cited

U.S. PATENT DOCUMENTS 10,671,596 B1 * 6/2020 Natanzon ............ G06F 11/2074
11,048,590 B1 * 6/2021 Sapuntzakis ........ G06F 11/1448
(Continued)

FOREIGN PATENT DOCUMENTS

CN 105210060 A * 12/2015 .......... G06F 11/1458
CN 111639086 A * 9/2020
(Continued)

OTHER PUBLICATIONS

Alexandre el al. "Amazon Aurora: Design Considerations for High Throughput Cloud-Native Relational Databases"; SIGMOD '17: Proceedings of the 2017 ACM International Conference on Managementof DataMay 2017 pp. 1041-1052https://doi.org/10.1145/3035918.3056101 (Year: 2017).*
(Continued)

*Primary Examiner* — Dennis Truong
(74) *Attorney, Agent, or Firm* — Womble Bond Dickinson (US) LLP

(57) ABSTRACT

A system performs a first query to retrieve a commit lag timestamp, where the commit lag timestamp specifies an earliest time instance when a record of an entity is inserted or updated, but is yet to be committed, to a data source. The system determines an inline crawl interval based on the commit lag timestamp. The system performs a second query based on the inline crawl interval to retrieve a number of record identifiers and/or modification dates. The system performs a third query based on the inline crawl interval, where the third query corresponds to records that exist in a data store. The system determines at least one identifier that is missing from the third query due to commit lag based on a difference between data corresponding to the second and third queries. The system persists data corresponding to the second query and the at least one missing identifier.

20 Claims, 11 Drawing Sheets

(58) Field of Classification Search
CPC ............. G06F 16/2308; G06F 16/2322; G06F 16/275; G06F 16/23; G06F 16/2315; G06F 11/1471; G06F 11/2064; G06F 11/1469; G06F 3/065
See application file for complete search history.

(56) References Cited

U.S. PATENT DOCUMENTS

| | | | |
|---|---|---|---|
| 2004/0230552 A1* | 11/2004 | Smith | G06F 16/27 |
| 2009/0313311 A1* | 12/2009 | Hoffmann | G06F 11/2097 |
| 2017/0147671 A1* | 5/2017 | Bensberg | G06F 16/24552 |
| 2021/0089238 A1* | 3/2021 | Muniswamy-Reddy | G06F 3/0637 |
| 2021/0232596 A1* | 7/2021 | Qi | G06N 20/00 |
| 2022/0171787 A1* | 6/2022 | Chen | H04L 67/568 |

FOREIGN PATENT DOCUMENTS

| | | | | |
|---|---|---|---|---|
| CN | 106909598 B | * | 10/2020 | ......... G06F 16/2365 |
| CN | 112380225 A | * | 2/2021 | |
| CN | 113779153 A | * | 12/2021 | |
| CN | 110324208 B | * | 6/2022 | ......... H04L 43/0829 |
| EP | 2928160 A1 | * | 10/2015 | ......... G06F 11/1438 |
| WO | WO-2006101633 A2 | * | 9/2006 | ......... G06F 11/1662 |
| WO | WO-2021061528 A1 | * | 4/2021 | ........... G06F 3/0604 |

OTHER PUBLICATIONS

Assaf el al. "Dynamic Synchronous/Asynchronous Replication" ACM Transactions on Storagevol. 9Issue 3, Aug. 2013 Article No. 8pp. 1-19https://doi.org/10.1145/2508011 (Year: 2013).*

* cited by examiner

| Vid | Crawl Type | Crawl Interval | Fetch Time | Mod. Flag | Add. Variables | Comments |
|---|---|---|---|---|---|---|
| 1 | Incremental | T15-T30 | T30 | {-1} | | Inline crawl is performed for crawl window between T5-T15, where previous latestDateCovered is T5 |
| | Inline | T5-T15 | T30 | {} | latestDateCovered: T25; numInlineRec: 1 | This data is saved along with the incremental record with T30 Fetch Time. |
| 2 | Incremental | T30-T45 | T45 | {} | | Since no modification is captured by inline, there is no modification flag (-1) added. |
| | Inline | T25-T30 | T45 | {} | latestDateCovered: T35; numInlineRec: 0 | No new modification is captured. |

| Vid | Crawl Type | Crawl Interval | Fetch Time | Mod. Flag | Additional Variables | Comments | Previous latestDateCovered |
|---|---|---|---|---|---|---|---|
| 1 | Incremental | T15-T30 | T30 | {-1} | ExternalFetch Time: T30; | External crawl is launched for interval (T5-T10) | T5 |
| | Inline | T10-T15 | T30 | {} | latestDateCovered: T25; | Inline crawl executed along with incremental crawl. | |
| 2 | External | T5-T10 | T30 | {} | latestDateCovered: T25; | External crawl completes at T50. | |
| 3 | Incremental | T30-T45 | T45 | {-1} | ExternalFetch Time: T30; | External crawl launched at T30 did not complete when current incremental crawl checked its status | T25 |
| | Inline | T25-T30 | T45 | {} | latestDateCovered: T25; | | |
| 4 | Incremental | T45-T60 | T60 | {-1} | ExternalFetch Time: T60; externalVids: 2 | A new inline crawl is launched at T60. External crawl is launched for (T25-T40) | T25 |
| | Inline | T40-T45 | T60 | {} | latestDateCovered: T50; | | |
| 5 | External | T25-T40 | T60 | {} | latestDateCovered: T50; | | |

FIG. 6

| Vid | Crawl Type | Crawl Interval | Fetch Time | Mod. Flag | Additional Variables | Crawl Status | Comments |
|---|---|---|---|---|---|---|---|
| 1 | Incremental | T15-T30 | T30 | {-1} | ExternalFetchTime: T30; | COMPLETED | External crawl is launched for interval (T5-T10) |
| | Inline | T10-T15 | T30 | {} | latestDateCovered: T25; | | This crawl is completed and saved along with incremental crawl. |
| 2 | External | T5-T10 | T30 | {} | latestDateCovered: T25; | COMPLETED_WITH_ERROR | This external crawl is terminated by incremental crawl at FetchTime T45. |
| 3 | Incremental | T30-T45 | T45 | {curr_eth_fields} | ExternalFetchTime: T30; | COMPLETED | External crawl with ExternalFetchTime T30 is terminated by marking its status as COMPLETED_WITH_ERRORS. Current crawl is launched as part of this incremental crawl. |
| 4 | Incremental | T45-T60 | T60 | {-1} | ExternalFetchTime: T60; | | |
| | Inline | T40-T45 | T60 | {} | latestDateCovered: T50; | | |
| 5 | External | T5-T40 | T60 | {} | latestDateCovered: T50; | | |

| Vid | Crawl Type | Crawl Interval | Fetch Time | Mod. Flag | Additional Variables | Comments | Previous latestDateCovered |
|---|---|---|---|---|---|---|---|
| 1 | Incremental | T15-T30 | T30 | {-1} | ExternalFetchTime: T30 | Sanity crawl was launched at this time. External sanity crawl is launched for interval (T5-T10) | T5 |
|  | Inline | T10-T15 | T30 | {} | latestDateCovered: T25 | This crawl is completed along with incremental crawl. |  |
| 2 | External | T5-T10 | T30 | {} | latestDateCovered: T25 | External crawl completed at T50. Object 1 captured with modStamp at T5 |  |
| 3 | Incremental | T30-T45 | T45 | {-1} | ExternalFetchTime: T30 | External sanity crawl launched at T30 did not complete when this incremental crawl checked. Object 1 captured with modStamp at T40 | T25 |
|  | Inline | T25-T30 | T45 | {} | latestDateCovered: T30 |  |  |
| 4 | Incremental | T45-T60 | T60 | {-1} | ExternalFetchTime: T60; externalVids:[2] | Reads the {-1} field and sends external sanity data to a loader with ExternalFetchTime T45. External sanity crawl is launched for (T30-T40) | T30 |
|  | Inline | T40-T45 | T60 | {} | latestDateCovered: T50 |  |  |
| 5 | External | T30-T40 | T60 | {} | latestDateCovered: T50 |  |  |

FIG. 8

METHOD AND SYSTEM FOR COLLECTING DATA FROM DATA SOURCES WITH COMMIT LAG TO MAINTAIN DATA CONSISTENCY IN A DATA STORE

RELATED APPLICATIONS

This application claims the benefit of U.S. provisional patent application No. 63/312,262, filed Feb. 21, 2022, which is incorporated by reference herein in its entirety.

FIELD OF THE INVENTION

Embodiments of the present invention relate generally to data processing by a data processing system. More particularly, embodiments of the invention relate to method and system for collecting data from data sources with commit lag to maintain data consistency in a data store.

BACKGROUND

Data analytics and data mining require analysis of large amounts of data. Data can be organized as fact and dimension tables in a time-series relational database. These tables allow analytical queries to retrieve data for a trend over period of time. For larger entities that have a lot of data, these tables can include tens of millions of records and queries, even with index optimizations, could take upwards of tens of minutes to execute.

In order to support real time data update/write backs, long-running transactions can cause data commit lags when data is mined from a database with data modification time different its completion (commit) time. For example, data mining with incremental crawl (queries), where data are queried at periodic intervals to gather the data from the data source can result in missing records if the records are modified during a particular interval but not yet committed to a data source.

As shown in FIG. 3 for an example interval, an incremental query when executed with an interval of Start Time (ST) to End Time (ET) ideally would retrieve data record that is inserted or modified within the interval. If a data record is modified at Modification Time (MT) but the changes are not reflected by the database until Commit Time (CT), which is beyond the incremental query interval of ST to ET, the change would not be captured by the incremental query for ST to ET. For a next interval, incremental query will execute a next interval with a start time from ET, and so forth. Since incremental crawl has already advanced in time, the data record with commit lag would be missed by the incremental query.

A solution is needed to address the issues of commit lag in collecting data with data consistency from a data source with incremental query.

BRIEF DESCRIPTION OF THE DRAWINGS

Embodiments of the invention are illustrated by way of example and not limited to the figures of the accompanying drawings in which like references indicate similar elements.

FIG. 5 illustrates inline+incremental crawl metadata records according to one embodiment.

FIG. 6 illustrates inline+incremental+external crawl metadata records according to one embodiment.

FIG. 7 illustrates metadata records with an external crawl failure according to one embodiment.

FIG. 8 illustrates metadata records to retrieve latest modified records according to one embodiment.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, described herein are systems and methods directed to collect data with data consistency from a data source with commit lag. The commit lag arises when insert/update/delete operations are executed but not yet reflected in a database of the data source (e.g., lag in data commit) at the time when the database is crawled. Although tabular relational databases are used as examples in the following paragraphs, data source can include a storage file system or other types of databases, such as noSQL databases, etc.

According to one embodiment, a system performs a first query to a data source to retrieve a commit lag timestamp, where the commit lag timestamp specifies an earliest time instance when a record of an entity is inserted or updated, but is yet to be committed, to the data source, where the commit lag timestamp is retrievable from the data source. The system determines an inline crawl interval based on the commit lag timestamp. The system performs a second query to the data source based on the inline crawl interval to retrieve a number of record identifiers and/or modification dates. The system performs a third query to a data store based on the inline crawl interval, where the third query corresponds to records that exist in the data store. The system determines at least one record identifier that is missing from the third query due to commit lag based on a difference between data corresponding to the second and third queries. The system stores data corresponding to the second query and data corresponding to the at least one missing record identifier to the data store.

Figure 1A:
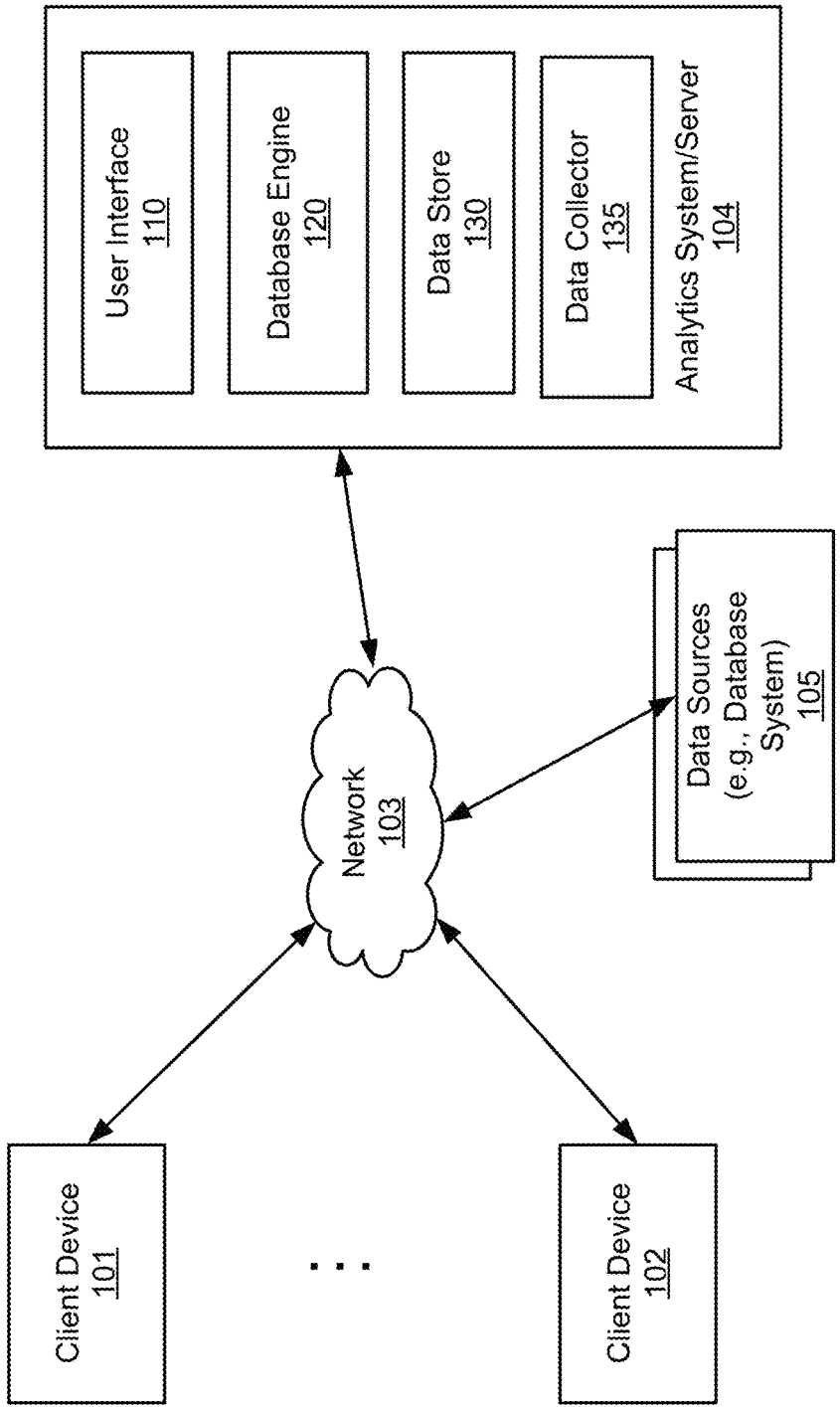
FIGS. 1A and 1B are block diagrams illustrating a network configuration according to certain embodiments.

FIG. 1A is a block diagram illustrating a network configuration according to one embodiment of the invention. Referring to FIG. 1A, system 100 includes, but is not limited to, one or more client systems 101-102 communicatively coupled to server 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Server 104 can be any kinds of servers or a cluster of servers, such as, for example, Web servers, application servers, cloud servers, backend servers, etc.

In one embodiment, server 104, which may be a cloud server, provides data analytics services to clients 101-102 based on task data provided by task database systems as a data source 105. Note that multiple task database systems may be implemented, where data analytics system 104 may be implemented as a multi-tenancy system that can access multiple task database systems concurrently. For example, a user of client device 101 may be associated with a first entity or organization as a first corporate client to data analytics system 104, while a user of client device 102 may be associated with a second entity or organization as a second corporate client to data analytics system 104. The first and second entities may employ different task database systems, each of which maintains a database or data structure storing a number of tasks completed or to be performed. Also note that a task database system is utilized as an example of data sources 105, however, other types of data sources or systems can also be used.

In one embodiment, data analytics system 104 includes, but it is not limited to, user interface 110, database engine 120 (also referred to as database manager, which may be part of database management software), and data store 130. User interface 110 can be any kind of user interface (e.g., Web, graphical user interface or GUI, or command line interface or CLI) that allows users of client devices 101-102 to access data analytics services provided by data analytics system 104, such as, for example, trend analysis, or pulse analysis services to be performed for various time periods. For example, via user interface 110, a user can request a trend snapshot/analysis for a set of tasks of a specific time period by specifying one or more attributes (database fields) associated with the tasks. Each of tasks can be associated with an entity (company or project or database table). Attributes can represent columns of a database table. Each entity can include numerous objects/records with at least attributes corresponding to an identifier attribute (to identify the object/record) and a modification date attribute (a time when the object/record is modified).

In response to a request received via user interface 110 from a client, such as clients 101-102, database engine 120 determines a period of time (e.g., a query time period) based on the request that the user is interested in. The query time period can be a current quarter, week, day, or year. Database engine 120 further determines a set of one or more attributes, which may be received from a user via user interface 110. Database engine 120 retrieves task data associated with the time period and the one or more attributes from data store 130.

Data store 130 stores or caches a variety of time-series data, such as projects, tasks, and product facts. Time-series data are data collected at different points in time. Data collector 135 can be configured to periodically collect or update data from data sources 105 to store in data store 130. For example, data collector 135 can periodically updated from corresponding data source(s) or data provider(s) 105, for example, via a periodically executed thread (which may be running as a subroutine or as a background job as a part of a housekeeping routine or thread) over a network (e.g., Internet). Alternatively, database engine 120 may dynamically access a task database system to query and retrieve task data using a variety of database accessing protocols associated with the task database system, such as an SQL protocol. Data stored in data store 130 can be maintained in a variety of data structures, such as one or more tables contained within one or more databases. Database engine 120 can access data store 130 via a variety of application programming interfaces (APIs), database queries, or other suitable communication protocols.

In one embodiment, database engine 120 performs data retrieval for one or more past time periods. Database engine 120 can retrieve data associated the determined past time periods from data store 130, where the retrieved data represents one or more facts. Database engine 120 can retrieve data for one or more time points for trend or pulse analysis.

Figure 1B:
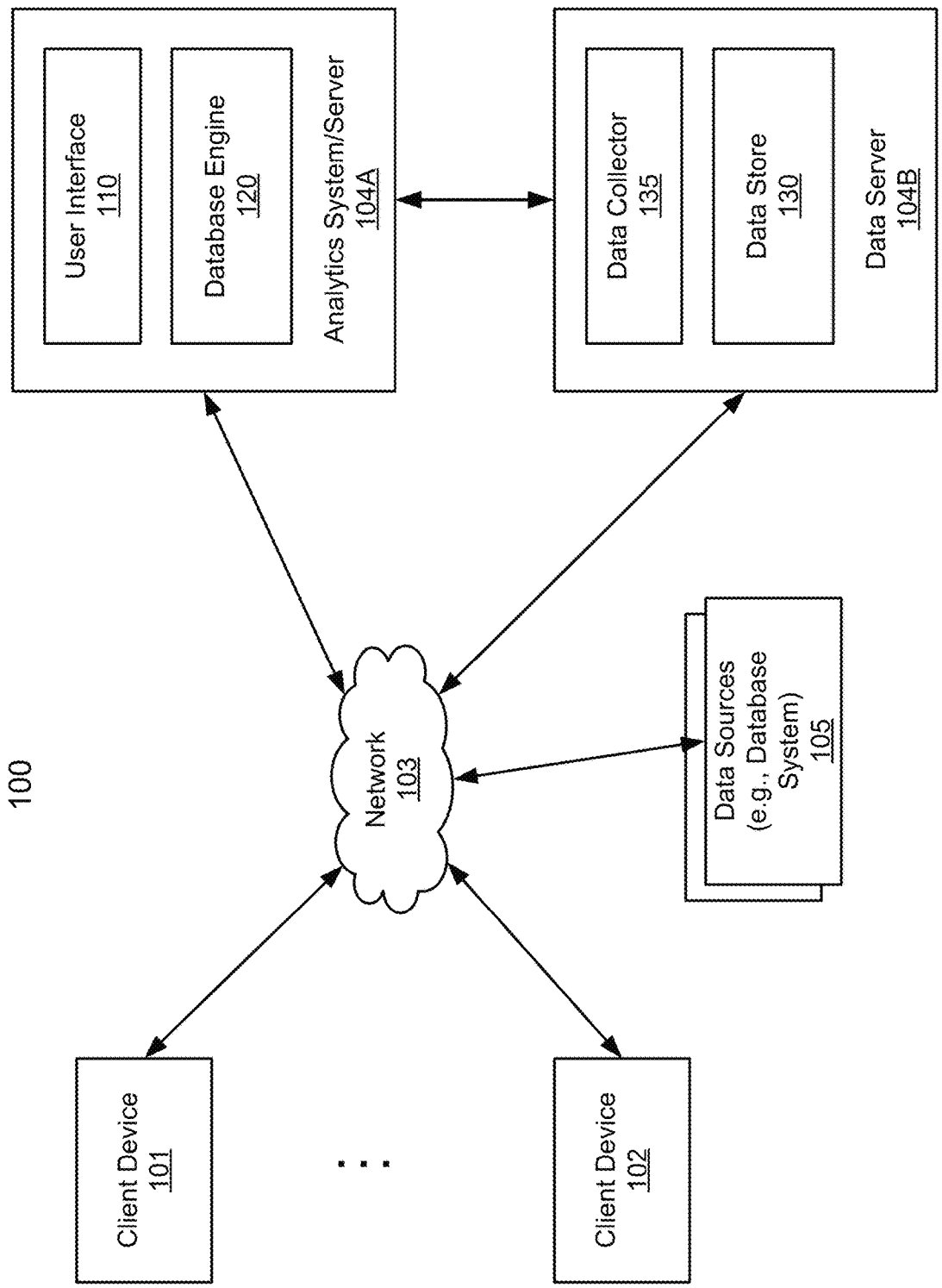

Although in this embodiment, data store 130 is maintained by data analytics system 104, however, data store 130 can be maintained in a dedicated data server that is a separate server from data analytics server 104 as shown in FIG. 1B. Referring now to FIG. 1B, in this embodiment, data analytics server 104A and data server 104B are implemented as separate servers. Data store 130 is now maintained by data server 104B. Data server 104B can further include data collector 135 configured to periodically or constantly collect or update task data from data sources 105. Data analytics server 104A can communicate with data server 104B using a variety of communication protocols to access task data stored in data store 130.

Figure 2:
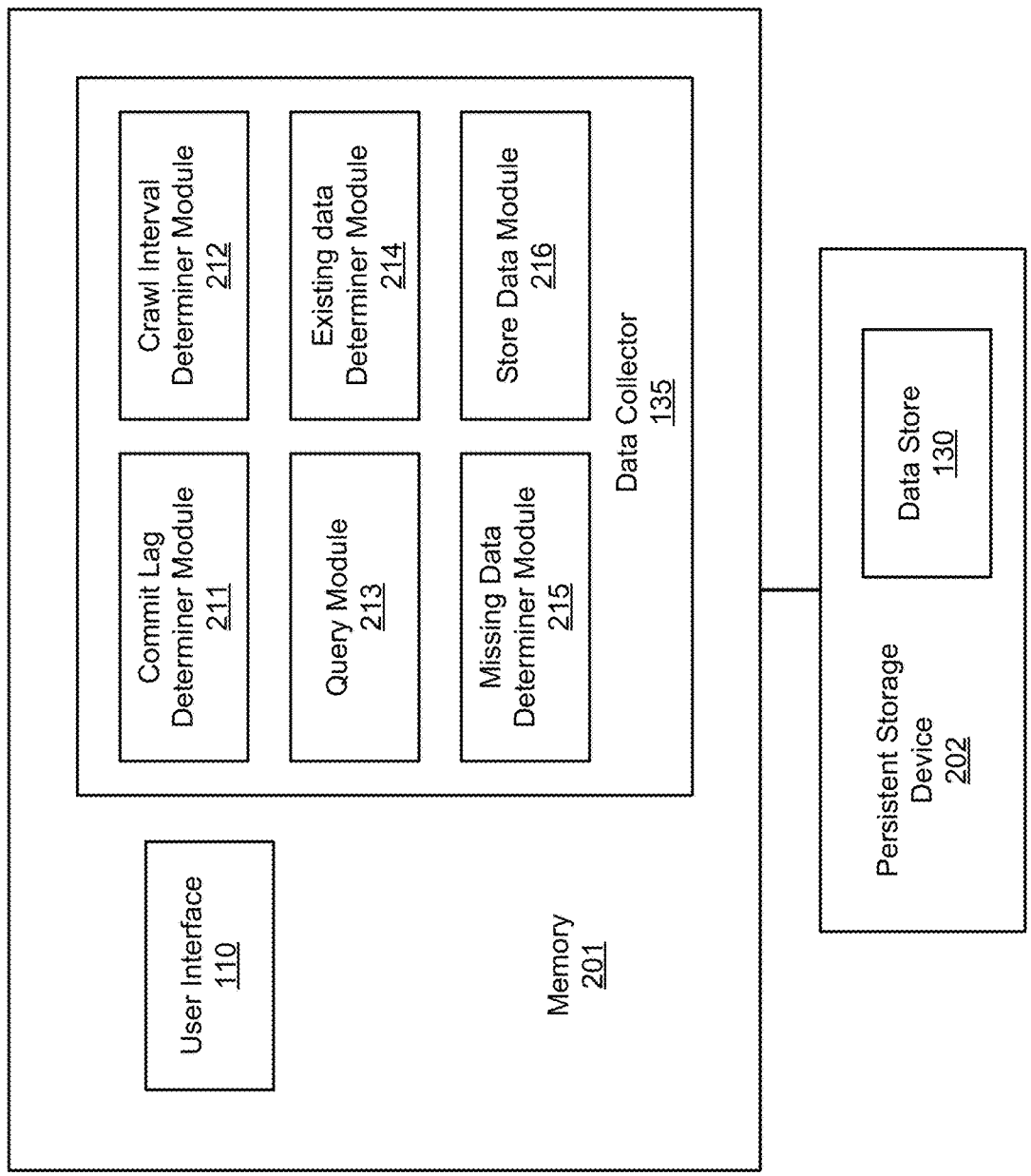
FIG. 2 is a block diagram illustrating an example of a data analytics system according to one embodiment.

FIG. 2 is a block diagram illustrating an example of a data analytics system 104 according to one embodiment of the invention. System 104 may be implemented as part of data analytics system 104A or server 104B. Referring to FIG. 2, system 104 includes user interface 110 and data collector 135 loaded in memory 201 and executed by one or more processors (not shown). Data store 130 is stored in persistent storage device 202, such as a hard disk, which may be maintained locally or remotely over a network. At least a portion of data stored in data store 130 may be cached in memory 201. In one embodiment, data collector 135 includes, but is not limited to, commit lag determiner module 211, crawl interval determiner module 212, query module 213, existing data determiner module 214, missing data determiner module 215, and store data module 216. Some or all of these modules may be implemented in software, hardware, or a combination thereof.

Commit lag determiner module 211 can determine a commit lag timestamp for the entity (or sub-entity (e.g., object/record, tasks, company) supported by the data source) at a data source. The commit lag timestamp can be determined by submitting a query and returning the results for the commit lag timestamp. For example, module 211 can query the data source, such as, call GetUpdated API, and obtain a LatestDateCovered timestamp from the query result. In one embodiment, the LatestDateCovered corresponds to the entity (or sub-entity). In another embodiment, LatestDateCovered corresponds to another entity with an earliest timestamp when the entity of interest does not provide an GetUpdated API.

Crawl interval determiner module 212 can determine an inline crawl interval or an external crawl interval as further described in FIGS. 5-6. Query module 213 can query/crawl data from a data source 105. Existing data determiner module 214 can determine existing data records residing in data store 130 for a crawl interval. Missing data determiner module 215 can determine a difference from crawled data and existing data. Store data module 216 can write data to data store 130. Some or all of modules 211-216 may be implemented in software, hardware, or a combination thereof. Some of modules 211-216 can be integrated modules. Some of modules 211-216 may be integrated together as an integrated module.

Incremental Crawls

Figure 3:
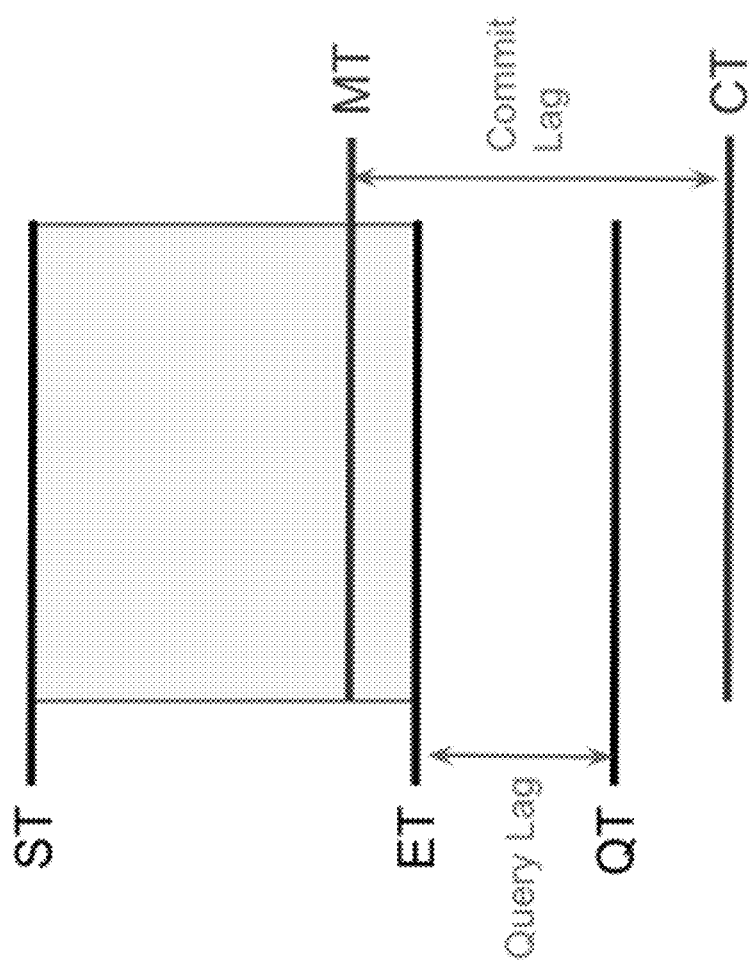
FIG. 3 illustrates an example of database commit lag.

Incremental samples of data can be crawled at regular periodic intervals from a data source for data warehousing. For example, analytics system 104 can crawl/query data source 105 at regular intervals (e.g., 15 minutes, 1 hours, etc.) and store the crawled data at data store 130. As described previously in FIG. 3, commit lag leads to missing data for incremental crawls when data at data source 105 is modified at a crawl interval, but not yet committed, at the time of crawl.

Inline Crawls

Inline crawl is proposed to be queried at a same time of a query of the incremental crawl but with a separate crawl interval. For example, incremental crawl can be maintained at regular periodic intervals (such as 15 minutes) but inline crawl can be performed for different crawl intervals (windows) as required.

In one embodiment, inline crawl is used to obtain the otherwise would-be missing data for data warehousing. The inline crawl can be performed at the same time as the incremental crawls or as a separate crawl. In one embodiment, the inline crawl is executed with a start time corresponding to a commit lag timestamp. The commit lag timestamp can reflect a time within an incremental crawl interval when at least a record is modified but has a commit time beyond the incremental crawl interval. In one embodiment, the commit lag timestamp is retrievable by an API call, e.g., getUpdated. For example, the API query: GetUpdatedResult[ ]=connection.getUpdated(string sObjectType, dateTime startDate, dateTime EndDate), would retrieve a GetUpdatedResult object containing information about each record that was inserted or updated within a specified startDate to EndDate. The GetUpdatedResult object can contain a dateTime object latestDateCovered indicating a commit lag timestamp within the startDate to EndDate interval.

In one embodiment, system 104 can obtain a commit lag timestamp for an entity for a particular crawl interval by querying the getUpdated API when the entity of the data source 105 supports the getUpdated query. The commit lag timestamp would indicate that at least one record is modified within the crawl interval with commit lag. That is, when a commit lag timestamp is returned for a particular time interval, at least one record modified during the time interval completed beyond the crawl interval due to a long running transaction, e.g., a commit time after the crawl interval. In this case, an incremental crawl executed for the particular time interval would have at least one missing record due to commit lag.

In one embodiment, when the queried entity of the data source 105 does not support API getUpdated, a commit lag timestamp can be derived from other entities of the data source that supports the API getUpdated. For example, system 104 can query one or more other entities with likeness to the current entity of interest to retrieve one or more commit lag timestamps. System 104 can then sort the one or more commit lag timestamps and determine an earliest of the one or more commit lag timestamps to be the commit lag timestamp for the current entity. Although the commit lag timestamp is not directly derived from the current entity, the earliest commit lag timestamp from the other entities, however, would have the best likelihood of capturing missing records for the current entity.

Combining the Incremental and Inline Crawls

Figure 4:
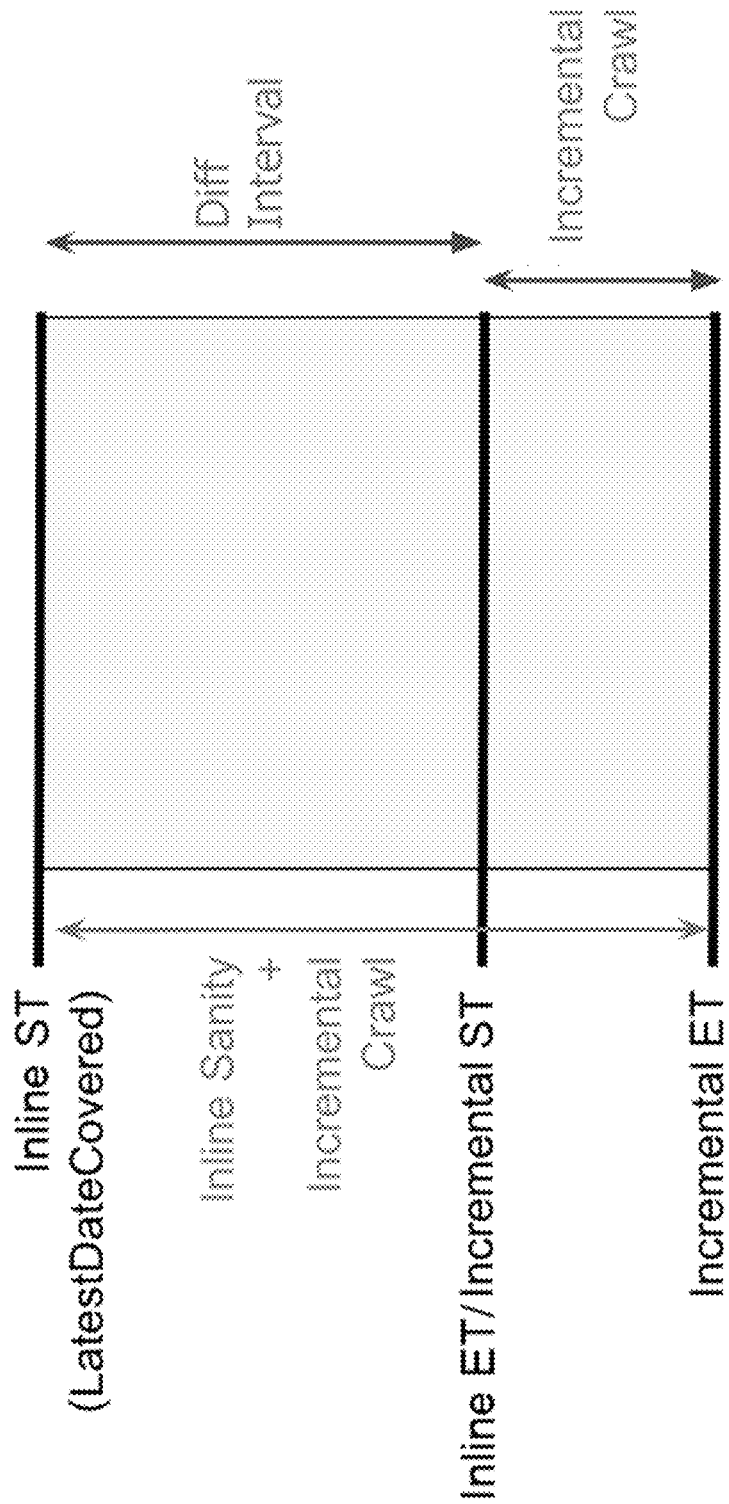
FIG. 4 illustrates an example of an inline+incremental crawl according to one embodiment.

As shown in FIG. 4, inline crawls can be performed at the same time as the incremental crawl to minimize API calls to data source 105. For example, for the incremental crawl, a processing logic, such as a processing logic of system 104 of FIG. 1, can query data source 105 to retrieve record identifiers and/or modification dates. Note that the record identifiers can be a "surrogate id" (SID) that uniquely identifies a time-series record (records with a same SID are considered to be the same time-series record). E.g., different versions of a time-series record (VIDs) can share the same SID. Note that the modification date can indicate the time when an insert/delete/update transaction is initiated for the entity. In one embodiment, all record attributes of the entity can be obtained from the crawl. The incremental crawl can be performed for an interval starting from incremental startTime (ST) to incremental endTime (ET), as soon as the data becomes available, e.g., current fetch time=increment ET. The inline crawls can join the incremental crawl with a start time of inline ST (or latestDateCovered) until inline ET, where inline ET=incremental ST.

In one embodiment, the data store 130 for the data warehousing is indexed for query. In one embodiment, when the data store 130 has not yet indexed or fails to return a result, inline crawl is skipped and only incremental crawl is performed. Once data store 130 returns a result, inline crawl can be executed. Here, existing data that has been previously crawled from data source 105 and are stored in data store 130 should be retrievable from data store 130 for comparison purposes to identify any missing records due to commit lag.

In one embodiment, data store 130 provides one or more APIs to query identifiers (IDs) and/or modification timestamps corresponding to one or more entities or sub-entities of the one or more entities. Examples of entities can be organization, customer, vendor, or client, etc. Examples of sub-entities of an entity can be a task, project, opportunity, or process, etc. corresponding to an entity. Note that modification timestamps can reflect insert/update/delete operations for database objects and/or delete/modify/new operations for file system objects. With IDs and modification timestamps, system 104 can perform a difference/compare operation for the crawled data from data source 105 and the existing data in data store 130 corresponding to the inline crawl interval to determine a difference data.

In one embodiment, data source 105 can include a delete API query to determine deleted objects, such as API GetDeleted. For entities that rely on the delete API to capture deleted identifiers, previous modifications should be included in the difference operation to ensure data consistency. That is, inclusion of previous modifications would not trigger the crawls to repeat a query for the would-be missing modifications. In other words, every data records, and not just the recently modified record, from data store 130 (e.g., inline and incremental crawl data stored at data store 130) are used for the difference operation.

In one embodiment, a difference operation compares data for corresponding crawl intervals of 1) inline/incremental crawl from data source 105 and 2) existing data in data store 130. For example, the difference operation can filter record identifiers present in 1) but not present in 2), and modification timestamp from 1) that is greater than the modification timestamp from 2). The filtered records of identifiers and/or modification timestamps can be used to indicate the missed records in the previous crawl, e.g., records missing from a previous incremental crawl caused by commit lag. In one embodiment, only data records for time interval (e.g., diff interval) between inline ST and inline ET/incremental ST are compared at a current iteration.

FIG. 5 illustrates inline+incremental crawl metadata records according to one embodiment. Metadata 500 can be stored in data store 130 of FIG. 1, where metadata 500 can be data records representative of the operations performed by processing logic, such as system 104 of FIG. 1, for the inline+incremental crawls. VID can represent a "version id" that identifies a particular version of a record. VID can be used for time series data for particular versions of a record. Time series data, also referred to as time-stamped data, is a sequence of data points indexed in time order. Time-stamped is data collected at different points in time. These data points typically consist of successive measurements made from the same source over a time interval and are used to track changes over time.

Referring to the example of FIG. 5, the notations T5, T15, T25, T30, T35, and T45 can represent the times of 5, 15, 25, 30, 35, and 45 minutes, or other multipliers (e.g., 1 hour or tens of minutes, etc.) respectively according to one embodiment. For example, given that an incremental crawl has a crawl window specified to be 15 minutes (given T5=5 minutes) with a previous latestDataCovered=T5, the record at version ID (VID)=1, indicates process logic performed an incremental crawl and an inline crawl at fetch time=T30. The incremental crawl and the inline crawl can be combined into a single incremental+inline query. The crawl window (incremental crawl interval) for the incremental crawl can be ST=T15 to ET=T30, where incremental ET is determined as the current fetch time, and incremental ST is determined using an incremental crawl interval pre-specified by an operator, e.g., 15 minutes. The crawl window (inline crawl interval) for the inline crawl can be ST=T5 to ET=T15, where the inline ST is determined by a previous latestDataCovered, which is equal to T5, and inline ET is determined as the ST of the incremental crawl.

In one embodiment, processing logic determines if inline retrieved any records and update metadata 500 accordingly. For example, processing logic updates the modification flag with {−1} to indicate inline retrieved at least one record. In this case, Processing logic can update the additional variables column to indicate a number of inline record (numInlineRec=1) to equal 1. In one embodiment, processing logic can call GetUpdated API to retrieve a commit lag timestamp (latestDataCovered)=T25, and store such information in the additional variables column. The commit lag timestamp can be used by inline crawl for the next fetch time.

At fetch time=T45 or VID=2, process logic performs an incremental crawl and an inline crawl. The crawl window (incremental crawl interval) for the incremental crawl is ST=T30 to ET=T45. The crawl window (inline crawl interval) for the inline crawl is ST=T25 to ET=T30, where the previous (at fetch time=T30) latestDataCovered is T25. In this case, the modification flag column is null, and variable numInlineRec at additional variables column is set to be 0 to indicate no inline records are retrieved. In one embodiment, processing logic call GetUpdated API to retrieve a commit lag timestamp (latestDataCovered)=T35, and store such information in the additional variables column when data for the incremental crawl for the crawl cycle are persisted in data store 130.

Since inline crawl captures data that are missed at the one or more previous incremental crawls, processing logic requires extraction of existing IDs/modification timestamps that were captured as part of the previous incremental/inline crawls for a difference operation. Further, for entities that rely on the GetDeleted API to capture deletes, older modifications can be included to ensure that the older modifications are not treated as missing modifications and be queried again.

In one embodiment, at each crawl cycle, processing logic performs a difference operation for identifiers present in results obtain at the inline+incremental query but not present in the existing data and also whose modification timestamp from the inline+incremental query is greater than their modification timestamp from the existing data. In one embodiment, for the difference operation for a particular crawl cycle, only data for the inline interval are compared to determine uncaptured modifications (e.g., data with commit lag).

In one embodiment, metadata records 500 can be stored as files (such as JSON files) or database records at data store 130 of FIG. 1. In one embodiment, data records can be retrieved by inline and/or incremental crawl as binary files and the binary files can be stored as one or more files (such as zip files) or database records in data store 130 for data warehousing. In one embodiment, the retrieved data records include attributes of record identifiers and/or modification timestamps. In one embodiment, the retrieved data records include all accessible/retrievable attributes for an entity. Once data are warehoused, the data are available for end-users for consumption.

External+Inline Crawl

For the scenario when an inline crawl window is beyond a limitation threshold, the inline crawl window (interval) can be split into inline and external windows. For the inline crawl window, the inline crawl approach can be used to crawl data, as previous described. For the external crawl window, an external crawl directed acyclic graph (DAG) can be triggered during the incremental crawl to execute outside of the context of the incremental/inline crawl. In this case, a background job is executed. Note, a DAG executes in a direct path with no cycles/loops. For example, external crawl can be executed as a background job, e.g., outside of the context of the incremental crawl, where the external crawl terminates successfully and is non-periodic. Note that the predetermined threshold may be a design choice to allow the inline+incremental crawl to complete within a threshold time so not to block the incremental crawl for a next iteration or imposed as an API limitation at the data source.

In one embodiment, processing logic combines the incremental crawl and inline crawl into a single query as previously described. In one embodiment, the inline crawl generates data records separately from incremental crawl. In one embodiment, a modified flag is asserted {-1} if any missing modifications are identified within the inline interval.

In one embodiment, completion of an incremental crawl for a particular interval triggers initiation of a DAG for the external crawl. In one embodiment, when triggered, processing logic adds an attribute "ExternalFetchTime" to the additional variable column of metadata for the crawl, as further described in FIG. 6. In one embodiment, inputs: external ST (e.g., latestDateCovered), external ET (e.g., inline ST), and/or retrieval information for the entity are passed to the DAG.

In one embodiment, external crawl retrieves record identifiers and/or modification timestamps for the external interval (e.g., external ST to external ET). Since the external crawl window can have a long duration, crawling all the retrievable fields for the long crawl window may reach a size limit imposed by the APIs of the data source. Thus, crawling only some fields can prevent a failure caused by API size limitation.

In one embodiment, processing logic extracts the data from data store 130 for comparison. For examples, identifiers and modification dates are retrieved from data store 130 corresponding to the external crawl interval. The identifiers and modification dates can be compared to obtain records with commit lag that is missing from data store 130. Processing logic can perform sorting and difference operations for the comparison. For example, during a difference computation, processing logic can obtain the identifier results sorted based on the modification time.

Using IDs from the difference operation (e.g., diff_ids), processing logic can retrieve the accessible/retrievable fields (e.g., enabled_fields) for the record identifiers. For example, the following query can be used to crawl the missing modifications related to the difference IDs:

Select <enabled_fields> from <entity> where id in <diff_ids> order by SysModStamp Where SysModStamp is the modification timestamp. For a large number of IDs, the above query can be split into multiple batches to overcome a query character limit.

In one embodiment, at a next iteration of incremental crawl, processing logic can check whether an external crawl is completed. If yes, processing logic can add attribute "externalVid" with a value of previous ExternalFetchTime's metadata record VID. In one embodiment, when the number of missing modifications are greater than a threshold number of records (e.g., 100k), the external crawl record can be divided into multiple batches for retrieval, and a completion flag can be used to indicate the completion of external crawl.

As previously described, the modified flag {-1} can be added to the modified flag attribute to indicate the external crawl identified at least one modification with commit lag. If processing logic detects that external crawl is still running at the next iteration, then "ExternalFetchTime" attribute can be forwarded to subsequent iterations until the external crawl reaches a terminal state. Processing logic can detect ExternalFetchTime at the subsequent iterations and execute an external crawl as required. An example of metadata records with external crawl is illustrated in FIG. 6.

FIG. 6 illustrates inline+incremental+external crawl metadata records 600 according to one embodiment. In this example, metadata 600 corresponds to an incremental crawl with an interval of T15, and an inline crawl configured with an inline threshold=T5 to trigger the external crawl. In one embodiment, the inline threshold can correspond to a restriction imposed by API of data source 105. In one embodiment, inline threshold is configurable by an operator.

Referring to FIG. 6, at Fetch Time=T30, for VID=1, given a previous commit lag timestamp (previous latestDateCovered)=T5, the metadata records 600 indicates that an incremental crawl is executed for T15-T30. Because the commit lag timestamp is T5 and the inline crawl threshold is T5, the inline crawl interval is divided into external crawl interval T5-T10 and inline crawl interval T10-T15.

As shown in FIG. 6, at Fetch Time=T30, inline crawl is executed for T10-T15. Incremental and inline crawls can be executed as a single query. Processing logic can query GetUpdated API to retrieve a "latestDateCovered: T25" for the current iteration.

At VID=2, incremental crawl triggers an external crawl to be executed for T5-T10, and "ExternalFetchTime: T30" is added to the "additional variables" attribute. In this scenario, external crawl has a completion time of T50.

At Fetch Time=T45 or VID=3, an incremental crawl is executed for T30-T45 and an inline crawl is executed for T25-T30. Since processing logic detects that the previously executed external crawl did not complete, processing logic carries forward the "ExternalFetchTime: T30" and "latestDateCovered: T25" variables and no new external crawl is executed during this interval. In one embodiment, when the external crawl is still running, the latestDateCovered would not be fetched since external crawl could fail. Instead, the latestDateCovered from the previous iteration is carried forward if the external crawl is still running.

At Fetch Time=T60 or VID=4, an inline crawl window is required for T25-T45. Here, processing logic divides inline crawl window into external crawl window T25-T40 and reduce the inline crawl window to the configured threshold of T5, e.g., T40-T45.

Processing logic executes an incremental crawl for T45-T60 and an inline crawl for T40-T45, where the results of the crawl are persisted onto data store 130. Processing logic initiates an external crawl for T25-T40 and indicates the initiation by adding "ExternalFetchTime: T60" to the additional variables attribute. Processing logic can query GetUpdated API to retrieve a "latestDateCovered: T50" for the current iteration.

Any missing modifications that are retrieved by the inline crawl or external crawl are identified by the modified flag attribute {-1}. When missing modifications are identified, process logic performs sort/difference operations on the retrieved data in comparison with the data store 130 to determine IDs that are missing (diff_ids) and/or modification dates.

Processing logic then retrieves the missing data from the data source using the diff_ids and/or modification dates.

In one embodiment, inline crawl data is saved along with incremental crawl data as two separate files, such as in zip format. When no commit lag modifications are found, then the zip file will contain a single file holding the incremental crawl data.

Handling Failures in External Crawl

When an external crawl fails or stops with error, a compensating crawl can be launched and the failed external crawl can be re-crawled at a next crawl iteration. For example, when an incremental crawl is executed and processing logic determines an external crawl is required, processing logic can check a crawl status of a previous external crawl prior to launching an external crawl. If the previous external crawl is marked as COMPLETED_WITH_ERROR, processing logic can forward the attribute "ExternalFetchTime" to a next metadata record. At the next incremental crawl, processing logic can identify the crawl failure and determine the external interval ST using the ExternalFetchTime from the failed crawl to initiate a new external crawl.

FIG. 7 illustrates metadata records 700 with an external crawl failure according to one embodiment. Metadata records 700 can correspond to a setup with an incremental crawl interval configured to T15, and an inline crawl threshold configured to T5.

In this example, at fetch time=T30, for VID=1, inline crawl has interval T10-T15 and incremental crawl has interval T15-T30. The crawl status for the incremental+inline crawl is completed.

For VID=2, which is an external crawl triggered at fetch time=T30, the external crawl has a crawl interval T5-T10, where external ST (T5)=previous latestDateCovered, and external ET (T10)=ST of inline. The crawl status for the external crawl (VID=2) is completed_with_error.

At fetch time=T45, processing logic initiates incremental crawl for interval T30-T45. Because the previous external crawl completed with an error (e.g., failure), processing logic terminates the external crawl and appends "ExternalFetchTime: T30" in the attributes. No inline crawl is initiated at this cycle. In one embodiment, a "current_fields" flag can be used to indicate additional retrievable field(s) are added in the data source and that a non-recurrent external crawl can be launched as part of the incremental crawl to extract data from these retrievable field(s).

At fetch time=T60, processing logic initiates incremental crawl for interval T45-T60, and inline crawl for T40-T45. At VID=5, processing logic initiates a compensating crawl (a background job that is similar to external crawl), where the compensating crawl inherits a previous ST of T5, and the compensating ET (e.g., T40) is configured to be the ST of the inline crawl at T60. The previous ST of T5 can be obtained from start time of the attribute "ExternalFetchTime: T30" which corresponds to the metadata at VID=2.

Handling Inaccessible/Added Fields

When any of the fields become inaccessible or are newly added during a crawl, processing logic can mark the crawl metadata record as COMPLETED_WITH_ERROR or FAILED and processing logic can either skip the inaccessible or re-crawl the added fields, respectively. For inaccessible fields in incremental crawl, only inline crawl is performed and external crawl is not triggered according to one embodiment.

Multiple Modifications During an Interval/Race Condition

In one embodiment, external crawls capture previous modifications while ongoing incremental crawls capture newer modifications to the data source. During external crawl, there is a possibility that the external crawl can capture modifications that are later captured by an incremental crawl. Since crawl samples are forward stamped, there is a possibility that incorrect values are incorporated. Processing logic can handle this scenario by ignoring the earlier modification of the same object if the latter modification is already incorporated, as further shown in FIG. 8.

FIG. 8 illustrates metadata records 800 to retrieve latest modified records according to one embodiment. In this example, at fetch time=T30, the external crawl at VID=2 captures an object (Object 1) identifier with a modification timestamp=T5. At fetch time=T45, incremental crawl captures the same object (Object 1) identifier with a modification timestamp=T40. In this case, processing logic can sort and merge data of the external and incremental crawls. Processing logic can filter the records and use the records with a latest modification timestamp. For example, processing logic can filter Object 1 by identifier for Object 1 and sort the modification timestamp. Processing logic then ignore the modification associated with the earlier modification timestamp T5 and only the modification for the object (Object 1) with the latest timestamp (T40) is persisted to data store 130.

Figure 9:
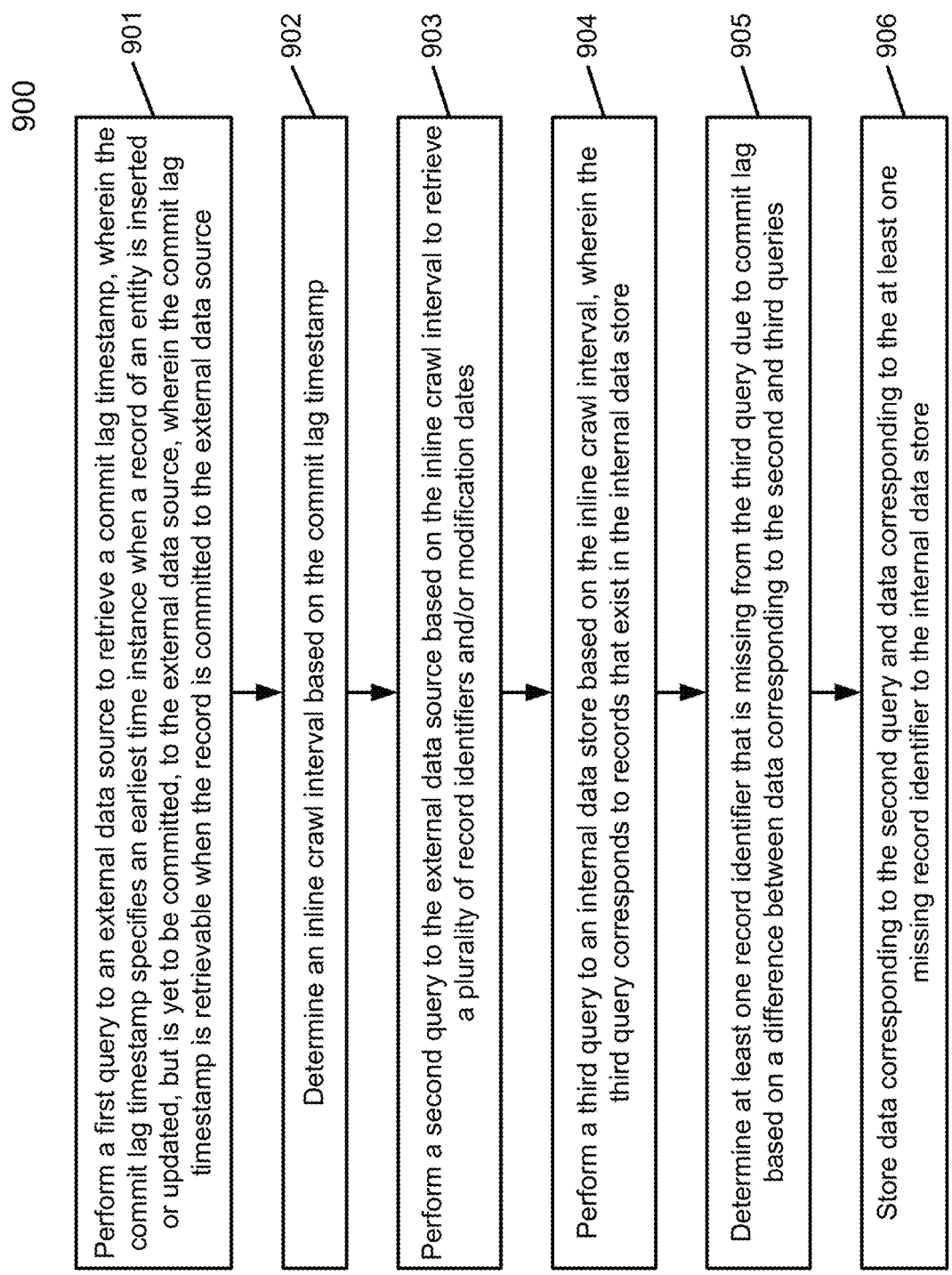
FIG. 9 is a flow diagram illustrating a process to perform a crawl according to one embodiment.

FIG. 9 is a flow diagram illustrating a process to perform a crawl according to one embodiment. Process 900 may be performed by processing logic which may include software, hardware, or a combination thereof. For example, process 900 may be performed by data collector 135 or system 104 of FIG. 1.

At block 901, processing logic performs a first query to a data source to retrieve a commit lag timestamp, where the commit lag timestamp specifies an earliest time instance when a record of an entity is inserted or updated, but is yet to be committed, to the data source, where the commit lag timestamp is retrievable from the data source.

For example, processing logic queries GetUpdated API from data source 105 to retrieve a "latestDateCovered" timestamp (commit lag timestamp).

At block 902, processing logic determines an inline crawl interval based on the commit lag timestamp.

For example, processing logic determines the inline crawl interval to have a start time (ST)="latestDateCovered", and an end time (ET)=ST of an incremental crawl interval. The incremental crawl can have a configurable crawl interval pre-specified by an operator for the incremental crawl to trigger at periodic intervals.

At block 903, processing logic performs a second query to the data source based on the inline crawl interval to retrieve a number of record identifiers and/or modification dates.

For example, processing logic performs a combined incremental+inline crawl query using respective crawl intervals from data source 105.

At block 904, processing logic performs a third query to a data store based on the inline crawl interval, where the third query corresponds to records that exist in the data store.

For example, process logic retrieves existing data from data store 130 corresponding to the crawl interval of the inline crawl.

At block 905, processing logic determines at least one record identifier that is missing from the third query due to commit lag based on a difference between data corresponding to the second and third queries.

For example, the retrieved data is sorted and a difference operation is performed to determine the additional data record identified by the inline crawl but were not in the data store 130.

At block 906, processing logic stores data corresponding to the second query and data corresponding to the at least one missing record identifier to the data store.

For example, processing logic retrieves the data for the incremental crawl and the additional data record identified by the inline crawl and persist the retrieved data to data store 130.

In one embodiment, the second query combines an inline query corresponding to the inline crawl interval and an incremental query corresponding to a periodic time interval, where the periodic time interval corresponds to a configurable time interval when the incremental query is performed on a periodic basis.

In one embodiment, the inline crawl interval specifies a time interval that begins at the commit lag timestamp and ends at a previous instance when the second query is performed.

In one embodiment, if the commit lag timestamp is greater than a predetermined threshold, process logic further causes a fourth query to be performed to the data source based on an external crawl interval to retrieve a plurality of record identifiers and/or modification dates, where the external crawl interval is determined based on the commit lag timestamp, and where the inline crawl interval for the second query is determined based on the predetermined threshold.

In one embodiment, the fourth query is performed by a background job separate from the performance of the first, second, or third queries.

In one embodiment, the background job launches only when a previous instance of the background job completes.

In one embodiment, processing logic further determines whether the background job encounters a failure, indicates the failure corresponding to the background job, terminates the background job, and launches a compensating background job at a next iteration based on a same commit lag timestamp.

In one embodiment, the background job encounters the failure when an additional database field is added to the record or when a database field is inaccessible.

In one embodiment, the second query is not performed when the compensating background job is launched.

In one embodiment, determining the at least one record identifier that is missing from the third query due to commit lag further includes filtering records with a same record identifier and two or more modification dates to only a latest modification date to capture a most recent change to the record, sorting and/or merging the filtered records corresponding to the second query to determine a first data, and sorting records corresponding to the third query to determine a second data, wherein the difference data is determined based on the first and second data.

In one embodiment, processing logic further performs a bulk query to retrieve entity data corresponding to the plurality of record identifiers and/or modification dates.

In one embodiment, the commit lag timestamp is determined at a first time instance and the second query is performed at a second time instance.

In one embodiment, if the entity does not support an interface to retrieve the commit lag timestamp, processing logic further determines one or more separate entities from a plurality of entities that supports an interface to retrieve a commit lag timestamp for the one or more separate entities. Processing logic performs the first query on the one or more separate entities to retrieve one or more separate commit lag timestamps. Processing logic determines the commit lag timestamp to be an earliest timestamp of the one or more separate commit lag timestamps.

Note that some or all of the components as shown and described above (e.g., database engine 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In one embodiment, an entity can be a user group, an organization or company, or a unit or department of an organization or company. A task database system can be a customer management system. A task refers to an action performed by an entity. A task represents an opportunity, a project, or a business process. For example, a task can be a process of negotiating an agreement between two entities such as an agreement for one entity (referred to as a target entity) to acquire services or goods from another entity (referred to as a source entity). A task can be performed in a number of task stages representing a progress of the task.

Figure 10:
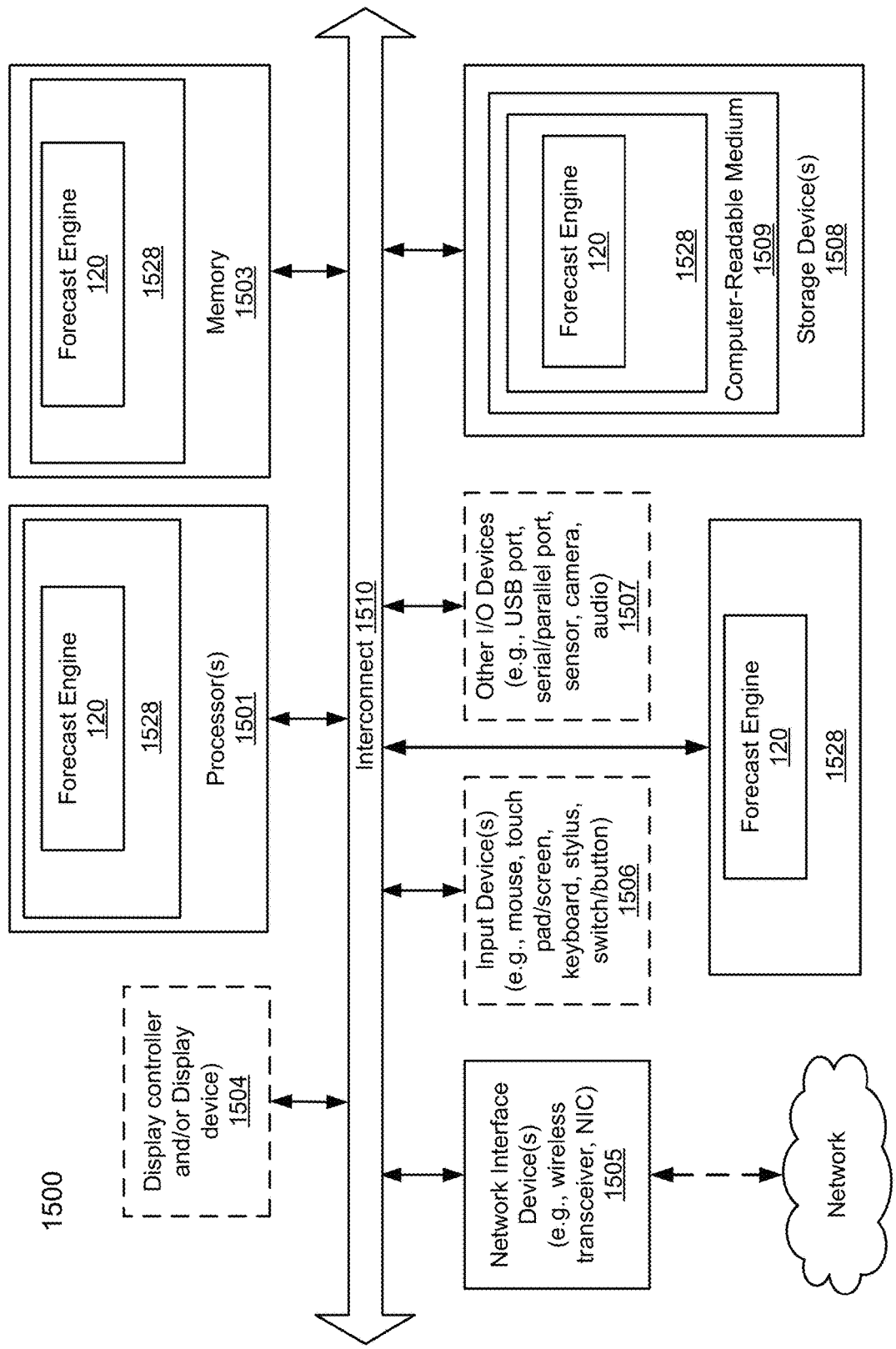
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, client devices 101-102 and server 104 of FIGS. 1A-B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to write a record to a database with time series data, the method comprising:
    performing a first query to a data source to retrieve a commit lag timestamp, wherein the commit lag timestamp specifies an earliest time instance when a record of an entity is inserted or updated, but is yet to be committed, to the data source, wherein the commit lag timestamp is retrievable from the data source;
    determining an inline crawl interval based on the commit lag timestamp;
    performing a second query to the data source based on the inline crawl interval to retrieve a plurality of record identifiers and/or modification dates;
    performing a third query to a data store based on the inline crawl interval, wherein the third query corresponds to records that exist in the data store;
    determining at least one record identifier that is missing from the third query due to commit lag based on a difference between data corresponding to the second and third queries; and
    storing data corresponding to the second query and data corresponding to the at least one missing record identifier to the data store.

2. The method of claim 1, wherein the second query combines an inline query corresponding to the inline crawl interval and an incremental query corresponding to a periodic time interval, wherein the periodic time interval corresponds to a configurable time interval when the incremental query is performed on a periodic basis.

3. The method of claim 1, wherein the inline crawl interval specifies a time interval that begins at the commit lag timestamp and ends at a previous instance when the second query is performed.

4. The method of claim 1, further comprising, if the commit lag timestamp is greater than a predetermined threshold, causing a fourth query to be performed to the data source based on an external crawl interval to retrieve a plurality of record identifiers and/or modification dates, wherein the external crawl interval is determined based on the commit lag timestamp, and wherein the inline crawl interval for the second query is determined based on the predetermined threshold.

5. The method of claim 4, wherein the fourth query is performed by a background job separate from the performance of the first, second, or third queries.

6. The method of claim 5, wherein the background job launches only when a previous instance of the background job completes.

7. The method of claim 5, further comprising:
    determining whether the background job encounters a failure;
    indicating the failure corresponding to the background job;
    terminating the background job; and
    launching a compensating background job at a next iteration based on a same commit lag timestamp.

8. The method of claim 5, wherein the background job encounters the failure when an additional database field is added to the record or when a database field is inaccessible.

9. The method of claim 5, wherein the second query is not performed when the compensating background job is launched.

10. The method of claim 1, wherein determining the at least one record identifier that is missing from the third query due to commit lag further comprises:
    filtering records with a same record identifier and two or more modification dates to only a latest modification date to capture a most recent change to the record;
    sorting and/or merging the filtered records corresponding to the second query to determine a first data; and
    sorting records corresponding to the third query to determine a second data, wherein the difference data is determined based on the first and second data.

11. The method of claim 1, further comprising performing a bulk query to retrieve entity data corresponding to the plurality of record identifiers and/or modification dates.

12. The method of claim 1, wherein the commit lag timestamp is determined at a first time instance and the second query is performed at a second time instance.

13. The method of claim 1, further comprising:
    if the entity does not support an interface to retrieve the commit lag timestamp, determining one or more separate entities from a plurality of entities that supports an interface to retrieve a commit lag timestamp for the one or more separate entities;
    performing the first query on the one or more separate entities to retrieve one or more separate commit lag timestamps; and determining the commit lag timestamp to be an earliest timestamp of the one or more separate commit lag timestamps.

14. A non-transitory machine-readable medium having instructions stored therein, which when executed by a processor, causing the processor to perform operations, the operations comprising:
- performing a first query to a data source to retrieve a commit lag timestamp, wherein the commit lag timestamp specifies an earliest time instance when a record of an entity is inserted or updated, but is yet to be committed, to the data source, wherein the commit lag timestamp is retrievable from the data source;
- determining an inline crawl interval based on the commit lag timestamp;
- performing a second query to the data source based on the inline crawl interval to retrieve a plurality of record identifiers and/or modification dates;
- performing a third query to a data store based on the inline crawl interval, wherein the third query corresponds to records that exist in the data store;
- determining at least one record identifier that is missing from the third query due to commit lag based on a difference between data corresponding to the second and third queries; and
- storing data corresponding to the second query and data corresponding to the at least one missing record identifier to the data store.

15. The non-transitory machine-readable medium of claim 14, wherein the second query corresponds to a time interval of the inline crawl interval and a periodic time interval of an incremental query, wherein the periodic time interval corresponds to a configurable time interval when the incremental query is performed on a periodic basis.

16. The non-transitory machine-readable medium of claim 14, wherein the inline crawl interval specifies a time interval that begins at the commit lag timestamp and ends at a previous instance when the second query is performed.

17. The non-transitory machine-readable medium of claim 14, further comprising, if the commit lag timestamp is greater than a predetermined threshold, causing a fourth query to be performed to the data source based on an external crawl interval to retrieve a plurality of record identifiers and/or modification dates, wherein the external crawl interval is determined based on the commit lag timestamp, and wherein the inline crawl interval for the second query is determined based on the predetermined threshold.

18. A system comprising:
- one or more processors; and
- a non-transitory storage medium comprising executable instructions, which when executed by the one or more processors, causes the one or more processors to perform operations, the operations comprising
  - performing a first query to a data source to retrieve a commit lag timestamp, wherein the commit lag timestamp specifies an earliest time instance when a record of an entity is inserted or updated, but is yet to be committed, to the data source, wherein the commit lag timestamp is retrievable from the data source;
  - determining an inline crawl interval based on the commit lag timestamp;
  - performing a second query to the data source based on the inline crawl interval to retrieve a plurality of record identifiers and/or modification dates;
- performing a third query to a data store based on the inline crawl interval, wherein the third query corresponds to records that exist in the data store;
- determining at least one record identifier that is missing from the third query due to commit lag based on a difference between data corresponding to the second and third queries; and
  - storing data corresponding to the second query and data corresponding to the at least one missing record identifier to the data store.

19. The system of claim 18, wherein the second query corresponds to a time interval of the inline crawl interval and a periodic time interval of an incremental query, wherein the periodic time interval corresponds to a configurable time interval when the incremental query is performed on a periodic basis.

20. The system of claim 18, wherein the inline crawl interval specifies a time interval that begins at the commit lag timestamp and ends at a previous instance when the second query is performed.

* * * * *